US012053788B2

(12) United States Patent
Ruan et al.

(10) Patent No.: US 12,053,788 B2
(45) Date of Patent: Aug. 6, 2024

(54) PUMP DISPENSER SYSTEM

(71) Applicant: The Procter & Gamble Company, Cincinnati, OH (US)

(72) Inventors: Dong Ruan, Beijing (CN); Wenhao Zhu, Beijing (CN); Jinlan Chang, Beijing (CN); Lei Tian, Beijing (CN); Ming Qi, Beijing (CN)

(73) Assignee: The Procter & Gamble Company, Cincinnati, OH (US)

(*) Notice: Subject to any disclaimer, the term of this patent is extended or adjusted under 35 U.S.C. 154(b) by 5 days.

(21) Appl. No.: 17/839,778

(22) Filed: Jun. 14, 2022

(65) Prior Publication Data

US 2022/0401983 A1 Dec. 22, 2022

(51) Int. Cl.
*B05B 11/10* (2023.01)

(52) U.S. Cl.
CPC ................................ *B05B 11/1042* (2023.01)

(58) Field of Classification Search
CPC ............. B05B 11/1041; B05B 11/0062; B05B 11/028; B05B 11/1069; B05B 11/1009; B05B 11/0032; B65D 25/52
See application file for complete search history.

(56) References Cited

U.S. PATENT DOCUMENTS 1,724,028 A * 8/1929 Kraft ...................... A47G 19/24 222/142.3
2,302,186 A * 11/1942 Caretto .................. A47G 19/24 222/142.3
3,866,803 A * 2/1975 Kipfmueller ............ B65D 1/32 D11/150
4,691,847 A 9/1987 Ford et al.
4,898,305 A * 2/1990 Morris ................... A47G 19/24 222/196.1

(Continued)

FOREIGN PATENT DOCUMENTS

CN 1200096 A 11/1998
CN 1671479 A 9/2005

(Continued)

OTHER PUBLICATIONS

AA01468F PCT Search Report and Written Opinion for PCT/CN2021/100757 dated Mar. 15, 2022, 11 pages.

*Primary Examiner* — Vishal Pancholi
(74) *Attorney, Agent, or Firm* — Elizabeth A. Conklin

(57) ABSTRACT

A dispenser system for dispensing a fluid product comprises: an elongated container containing the fluid product to be dispensed, a pump assembly coupled with the elongate container from the distal end, a piston which is slidably positioned in the container at the closed proximal end and contacting with the fluid product, and a standing cap. The standing cap has an opening for engaging the pump assembly, and has a supporting structure opposite to the opening, wherein the supporting structure comprises one or more supporting sections that define a supporting plane, wherein the dispenser system, when in a main standing position, stands upon the supporting structure of the standing cap, with the closed proximal end of the elongated container is on the topmost. Further the supporting structure of the standing cap has a projected area on the supporting plane which is larger than the largest cross-sectional area of the elongated container.

16 Claims, 4 Drawing Sheets

(56) References Cited

U.S. PATENT DOCUMENTS

| | | | | |
|---|---|---|---|---|
| 6,349,851 | B1 * | 2/2002 | Lu | B05B 11/0005 222/39 |
| 6,705,492 | B2 * | 3/2004 | Lowry | B65D 1/32 222/215 |
| 7,320,415 | B2 * | 1/2008 | McGuyer | A47J 47/16 222/197 |
| 2012/0024907 | A1 * | 2/2012 | Law | B05B 11/1074 222/256 |

FOREIGN PATENT DOCUMENTS

| | | | |
|---|---|---|---|
| CN | 101784456 | A | 7/2010 |
| CN | 102126575 | A | 7/2011 |
| CN | 111132723 | A | 5/2020 |

* cited by examiner

PUMP DISPENSER SYSTEM

FIELD OF THE INVENTION

The invention is directed to a pump dispenser system and methods for using the same.

BACKGROUND OF THE INVENTION

Pump dispensers have been widely used in consumer goods especially for viscous materials, e.g. shampoo, body wash or hand wash. Among them, airless pump dispensers became popular as the airless pump mechanism provides advantages such as no left-over in container, less contamination, longer shelf life, etc. An airless pump, as implied in its name, is configured to have a vacuum vessel in the dispenser system so that no air is released into the vessel after each dosage. To achieve such function, a piston is configured at the bottom of the container in airless pump dispenser. Upon pressing the pump head, the piston moves upwards for a certain distance and pushes the product out through a nozzle. After one round of dosage, the piston stays upwards a bit, until after multiple times of dosage, the piston moves to the top end of the product container where no product is left. A disadvantage associated with the airless pump is that gravity center of the airless pump dispenser will move upwards upon usage. Usually, airless pump dispensers used for personal care product (e.g. beauty care product or oral care product) have a regular shape such as a cylinder shape. When the center of gravity moves upwards, the dispenser tends to be instable for standing on a plane, and the potential risk of falling down is increased. Therefore, there is a need for an airless pump dispenser which can stably stand, during the entire lifetime.

SUMMARY OF THE INVENTION

In one aspect, the present invention is directed to a dispenser system for dispensing a fluid product, comprising:

a) an elongated container containing the fluid product to be dispensed, the container extends along a longitudinal axis and has a closed proximal end and an open distal end, b) a pump assembly coupled with the elongate container from the distal end, wherein the pump assembly comprises: i) an outlet where the fluid product is dispensed out, and ii) an actuator engaged with the outlet;

c) a piston which is slidably positioned in the container at the closed proximal end and contacting with the fluid product, wherein the piston moves towards the open distal end upon the actuator being operated and fluid product being dispensed through the outlet, and d) a standing cap, the standing cap has an opening for engaging the pump assembly, and has a supporting structure opposite to the opening, wherein the supporting structure comprises one or more supporting sections that define a supporting plane, and wherein the supporting plane has a projected area that is larger than the largest cross-sectional area of the elongated container, wherein the dispenser system, when in a standing position, stands upon the supporting structure of the standing cap, with the closed proximal end of the elongated container being on the topmost.

In another aspect, the invention provides for a method of using a dispenser system, comprising:

i) disconnecting the standing cap from the container and pump assembly, and ii) holding the container and press the actuator of the pump assembly by finger or thumb to dispense the fluid product.

Without being bound by any theory, due to the working mechanism, an airless pump changes its gravity center position as it is used. If an elongated container is positioned as usually where the outlet is upwards, upon the usage, the gravity center will go up and eventually the container is getting less stable. The configuration described in the present invention surprisingly and cost-effectively solve this problem. By introducing the standing cap with unique supporting structure (having a larger projection area than the cross-sectional area of the container), a specific configuration is constitute where the pump assembly was engaged and accommodated into the standing cap with the closed proximal end of the container is on the topmost. It achieves a much better stability of the dispenser system as the gravity center will be lowered upon usage, as well as the support structure provides extra stability support.

An advantage of the present invention is to provide a dispenser system able to stand more stable, even upon multiple use.

Another advantage is that the present invention provides the dispenser system to stand on the standing cap, so that the closed proximal end of the container will be kept hygienic, not be contaminated.

Still another advantage will be the dispenser system can provide delight to consumer with desired shape.

These and other features of the present invention will become apparent to one skilled in the art upon review of the following detailed description when taken in conjunction with the appended claims.

BRIEF DESCRIPTION OF THE DRAWINGS

While the specification concludes with claims particularly pointing out and distinctly claiming the invention, it is believed that the invention will be better understood from the following description of the accompanying figures in which like reference numerals identify like elements, and wherein:

DETAILED DESCRIPTION OF THE INVENTION

It is to be understood that the scope of the claims is not limited to the specific devices, apparatuses, methods, conditions or parameters described and/or shown herein, and that the terminology used herein is for the purpose of describing particular embodiments by way of example only and is not intended to be limiting to the claimed invention. Also, as used in the specification including the appended claims, the singular forms "a", "an", and "the" include the plural.

As used herein, any of the terms "comprising", "having", "containing", and "including" means that other steps, ingredients, elements, etc. which do not adversely affect the end result can be added. Each of these terms encompasses the terms "consisting of" and "consisting essentially of". Unless otherwise specifically stated, the elements and/or equipment herein are believed to be widely available from multiple suppliers and sources around the world.

As used herein, the term "consumers" is meant to include the customers who purchase the product, users of the product, or the store owners or managers who decide whether to stock their shelves with the product.

As used herein, the term "oral care product" is meant a product, which in the ordinary course of usage, is not intentionally swallowed for purposes of systemic administration of particular therapeutic agents, but is rather retained in the oral cavity for a time sufficient to contact substantially all of the dental surfaces (i.e., tooth) and/or oral tissues for treatment of oral cavity sensitivity. The oral care product may be in various forms including toothpaste, dentifrice, tooth gel, subgingival gel, mouth rinse, mousse, foam or denture product. The term "oral care product" may also include treatment regimens where these aforementioned compositions may be applied to teeth via an implement, such as a toothbrush or the like.

The term "dentifrice product", as used herein, includes tooth or subgingival—paste, gel, or liquid formulations unless otherwise specified. The dentifrice composition may be in any desired form, such as deep striped, surface striped, multilayered, having a gel surrounding a paste, or any combination thereof. Each dentifrice composition in a dentifrice comprising two or more separate dentifrice compositions may be contained in a physically separated compartment of a dispenser and dispensed side-by-side.

Pump Dispenser

Figure 1:
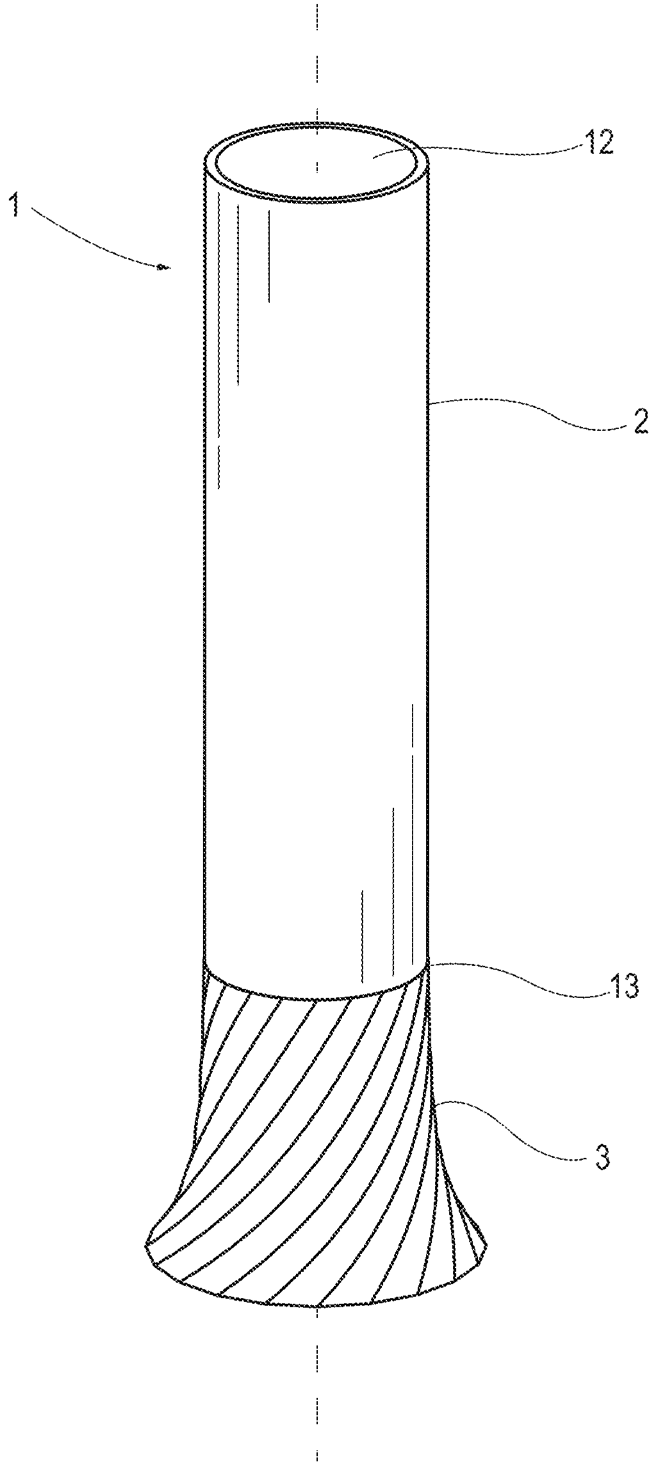
FIG. 1 shows a front view of a pump dispenser (1) according to an embodiment of the present invention.
Figure 2:
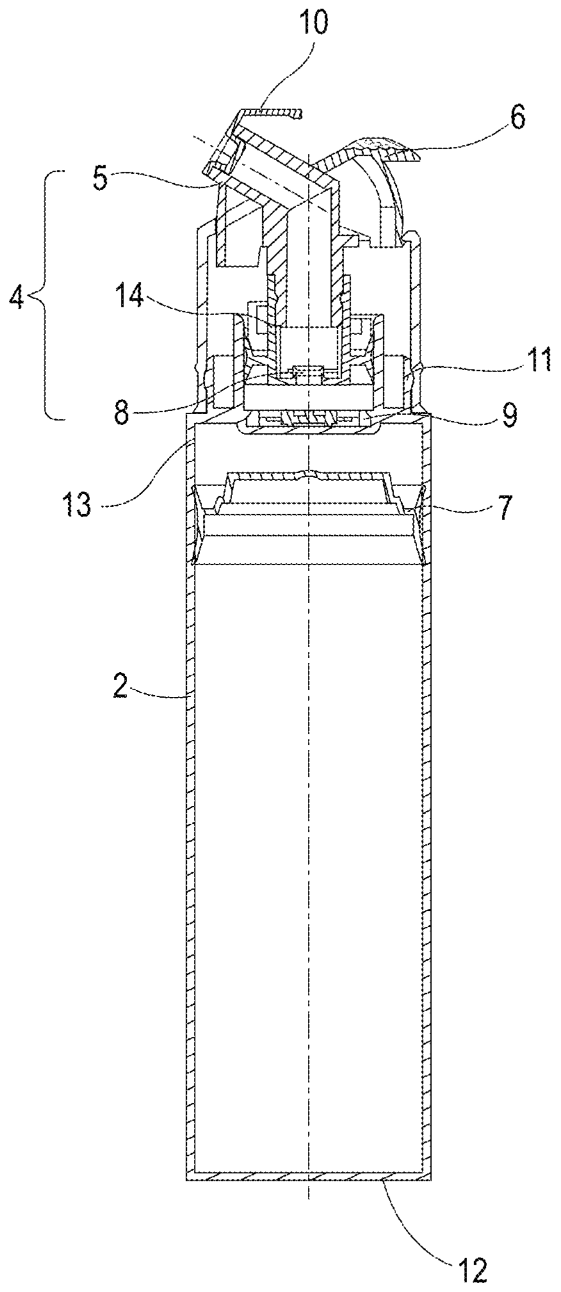
FIG. 2 shows a cross-sectional view of the pump dispenser (1) according to the embodiment of the present invention.

FIG. 1 and FIG. 2 show a pump dispenser system (1) according to an embodiment of the present invention. FIG. 1 shows a front view of the pump dispenser system (1), at a standing position. FIG. 2 shows a front sectional view of the pump dispenser system (1) without the standing cap (2), at a usage position with nozzle upwards.

FIG. 1 shows a dispenser system (1) for dispensing a fluid product. The dispenser system (1) comprises an elongated container (2) and a standing cap (3). The elongated container (2) contains fluid product to be dispensed. The container (2) can be any suitable shape, e.g. cylindrical. The elongated container (2) extends along a longitudinal axis (L) and has a closed proximal end (12) and an open distal end (13) which is coupled to a pump assembly (not shown in FIG. 1) which is accommodated in the standing cap (3). The dispenser system (1) in FIG. 1 is in a main standing position, where the closed proximal end (12) of the elongated container (2) is on the topmost.

During usage, a user can hold the elongated container (2) by one hand and push open the standing cap (3) by another hand. The container (2) hold in hand can be then positioned at any direction as long as being feasible to be pressed and to dispense the fluid product. For example, it can be positioned as the closed proximal end (12) towards down, or it can be hold at hand and form an angle orthogonal to the plane to be dispensed on, e.g. toothbrush plane.

FIG. 2 shows a front view of the pump dispenser system (1) described in FIG. 1, without showing the standing cap. The figure is showing tube with closed proximal end (12) turning around to the end, as a usage position.

The pump dispenser (1) contains a pump assembly (4) which is coupled with the elongated container (2) from the distal end (12). The pump assembly (4) comprises an outlet (5) where the fluid product is dispensed out, and an actuator (6) engaged with the outlet (5).

Inside the elongated container (2), there is a piston (7) which is positioned in the container (2) and contacting with the fluid product. The piston (7) can slidably move from the closed proximal end (12) towards distal end (13) in the container (2) upon each dispersion. Optionally, there is a stopper (10) plugged onto the outlet (5).

In this particular example, the pump assembly (4) further contains a pump plug (14), an upper valve (8) and a lower valve (9). The actuator (6) is coupled to the outlet (5) and the outlet (5) is fixedly connected to the pump plug (14), so the movement of the pressing actuator (6) drives the outlet (5) to move in the axial direction (L) of the container (2), and then drives the pump plug (14) to move in the axial direction (L). The upper valve (8) and the lower valve (9) are both check valve (one way valve). The upper valve (8) is arranged at the bottom of the pump plug (14), and only allows gas flow upward through the upper valve (8). The lower valve (9) is arranged at the distal end (13) of the container (2), and only allows gas flow upward through the lower valve (9). Between the upper valve (8) and the lower valve (9), a pump chamber is defined with a small amount of fluid accommodated therein.

When in use, the user presses the actuator (6) downwardly, and drives the outlet (5) and the pump plug (14) to move towards closed proximal end (12), the air pressure in the pump chamber formed between the upper valve (8) and the lower valve (9) rises, and the upper valve (8) is opened, so that the fluid in the pump chamber is extruded out of the outlet (5). The user releases the pressing on actuator (6), and the pump plug (14) and the outlet (5) move backwards under the action of the elastic restoring force of the spring and return to the starting position. At this time, the upper valve (8) is closed. As the inner space of the pump chamber increases, the air pressure drop forms a vacuum, and the lower valve (9) is opened, so that the fluid in the container (2) enters the pump chamber, and the piston (7) moves towards the outlet by the atmosphere. When the user presses the actuator (6) again, the fluid in the pump chamber is extruded again out of the outlet (5).

Figure 3:
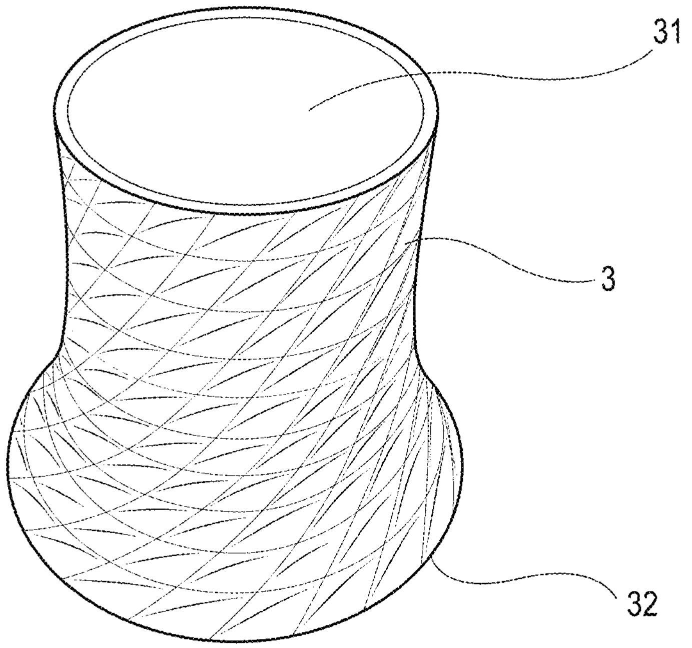
FIG. 3 shows perspective view of a standing cap in one embodiment of the present invention.

FIG. 3 shows a perspective view of a standing cap (3) part of the dispenser system (1) described in FIG. 1. The standing cap (3) has an opening (31) for engaging the pump assembly (4). It can be fitted closely by a snap-lock mechanism or can be screwed on the distal end (13) of the container by a threaded portion. In an example, the opening (31) of the standing cap (3) has a threaded portion on the inner wall of the opening (31). The standing cap (3) also has a supporting structure (32) opposite to the opening (31). The supporting structure (32) comprises one or more supporting section which defines a supporting plane. In the present invention, the supporting structure of the standing cap has a projected area on the supporting plane which is larger than the largest cross-sectional area of the elongated container. In the example of FIG. 3, the supporting structure (32) comprises a circular supporting section, where the projected area of the supporting structure on the supporting plane is larger than the cross-sectional area of the cylindrical container.

Figure 4:
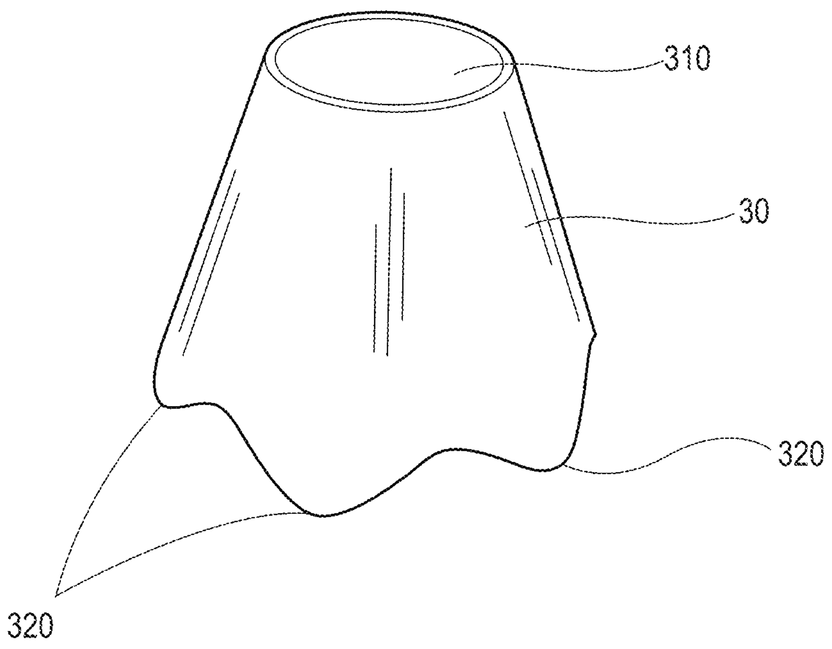
FIG. 4 shows another example of a standing cap in one embodiment of the present invention.

FIG. 4 shows another example of a standing cap (30) of a dispenser system of the present invention. The standing cap (30) has an opening (310) and a supporting structure (320) opposite to the opening (310). The supporting structure (320) comprises one or more supporting sections (330) that defines a supporting plane.

Without being bound by any theory, if the dispenser is positioned as usually where the outlet is upwards, upon the piston move upwards as described above, the gravity center of the whole dispenser system will go up and eventually the stability is getting worse. The configuration described in the present invention surprisingly and cost-effectively solve this problem. By introducing the standing cap with unique supporting structure, the pump assembly was engaged and accommodated into the standing cap with the closed proximal end of the container is on the topmost. It achieves a much better stability of the dispenser system as the gravity center will be lowered upon usage, as well as the support structure provides extra stability support. And the dispenser system of the present invention also provides pleasant visual attractions.

In some examples, the supporting structure of the standing cap has a projected area on the supporting plane which is larger than the largest cross-sectional area of the elongated container. Preferably, the projected area the supporting structure of the standing cap on the supporting plane is at least 5% larger, preferably at least 10% larger, more preferably at least 20% larger than the largest cross-sectional area of the elongated container.

In some examples, the depth of the opening of the standing cap is at least 5% less than the height of the standing cap, preferably at least 10% less than the height of the standing cap. The depth of the opening means the longest inner depth of the opening of the standing cap. The height of the standing cap is measure as the height from the supporting plane to the opening plain, when the standing cap stands on the supporting structures.

In some examples, the ratio of the height of the standing cap to the height of the whole dispenser system is from about 1:3 to about 1:10, preferably from about 1:3.5 to about 1:8, more preferably from about 1:4 to about 1:6. The height of the whole dispenser system is measure when the standing cap is fixedly engaged with the pump assembly portion of the dispense system. For example, the height of the dispenser system can be from about 5 cm to about 30 cm, preferably from 7 cm to about 23 cm, more preferably from 10 cm to about 17 cm.

In some examples, the elongated container may have any suitable cross-sectional shape. For example, it could be a cylinder container, i.e. has a circular cross-section. It could also have a cross-section with an oval shape, or a square shape, or a rectangular shape, and the like. Preferably the elongated container has an aspect ratio of no less than 3:1. The aspect ratio herein means the ratio of the length of the container to the longest dimension of the cross-section plane. Preferably the aspect ratio is no less than 3.5:1, more preferably is no less than 4:1.

In some examples, the dispenser system of the present invention contains a toothpaste. Preferably, the toothpaste contained in the dispenser system of the present invention can comprise fluoride ion source and/or stannous ion source.

The present invention also provides a method of use of the dispenser system described above. The method comprises i) disconnecting the standing cap from the container and pump assembly, and ii) holding the container and press the actuator of the pump assembly by finger or thumb to dispense the fluid product.

Fluid Product

The dispenser system is used to dispense fluid product which is preferred a viscous product. Particularly, the fluid product to be dispensed by the system of the present invention is a viscous product having a viscosity of 100,000 centipoise ("cP") to 900,000 cP. For example, the fluid product can be an oral care product, a beauty care product, a fabric care product, a home care product, a hair care product, as long as the product has a viscosity of 100,000 cP to 900,000 cP. For example, the fluid product can be a toothpaste, or an oral care treatment gel, or a facial cream, or a serum, or a shampoo, or conditioner.

A method for assessing viscosity is described. The viscometer is Brookfield® viscometer, Model DV-I Prime with a Brookfield "Helipath" stand. The viscometer is placed on the Helipath stand and leveled via spirit levels. The E spindle is attached, and the viscometer is set to 2.5 RPM. Detach the spindle, zero the viscometer and install the E spindle. Then, lower the spindle until the crosspiece is partially submerged in the paste before starting the measurement. Simultaneously turn on the power switch on the viscometer and the helipath to start rotation of the spindle downward. Set a timer for 48 seconds and turn the timer on at the same time as the motor and helipath. Take a reading after the 48 seconds. The reading is in cP.

It should be noted that Figures described above provide a non-limiting example of the pumping dispensing container and the pumping member thereof, which is merely for illustrating an implementation of the pumping action of the pumping dispensing container. However, the pumping dispensing container and the pumping member thereof of the present disclosure are in no way limited to the illustrated pumping dispensing container and the pumping member thereof. In fact, any pumped dispenser system can be applied to the pumped dispensing container according to the present disclosure described in detail below as long as it is capable of pumping a fluid, in particular a viscous fluid such as a paste.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical limitations were expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dispenser system for dispensing a fluid product, comprising:

a) an elongated container containing the fluid product to be dispensed, wherein the elongated container extends along a longitudinal axis and has a closed proximal end and an open distal end, b) a pump assembly coupled with the elongate container at the open distal end, wherein the pump assembly comprises:

i) an outlet where the fluid product is dispensed out, and ii) an actuator engaged with the outlet, c) a piston which is slidably positioned in the elongated container at the closed proximal end and is in contact with the fluid product, wherein the piston moves towards the open distal end upon the actuator being operated and the fluid product being dispensed through the outlet, and d) a standing cap, the standing cap having an opening for engaging the pump assembly, and having a supporting structure opposite to the opening, wherein the supporting structure comprises a plurality of supporting sections that define a supporting plane, and wherein the supporting plane has a projected area that is larger than a largest cross-sectional area of the elongated container, wherein the dispenser system, when in a standing position, stands upon the supporting structure of the standing cap, with the closed proximal end of the elongated container defining a top of the dispenser system.

2. The dispenser system according to claim 1, wherein the projected area of the supporting plane of the standing cap is at least 5% larger than the largest cross-sectional area of the elongated container.

3. The dispenser system according to claim 2, wherein the projected area of the supporting plane of the standing cap is at least 10% larger than the largest cross-sectional area of the elongated container.

4. The dispenser system according to claim 3, wherein the projected area of the supporting plane of the standing cap is at least 20% larger than the largest cross-sectional area of the elongated container.

5. The dispenser system according to claim 1, wherein a depth of the opening of the standing cap is at least 5% less than a height of the standing cap.

6. The dispenser system according to claim 5, wherein the depth of the opening of the standing cap is at least 10% less than the height of the standing cap.

7. The dispenser system according to claim 1, wherein a ratio of a height of the standing cap to a height of the dispenser system is from 1:3 to 1:10.

8. The dispenser system according to claim 1, wherein a ratio of a height of the standing cap to a height of the dispenser system is from 1:3.5 to 1:8.

9. The dispenser system according to claim 1, wherein a ratio of a height of the standing cap to a height of the dispenser system is from 1:4 to 1:6.

10. The dispenser system according to claim 1, wherein the standing cap engages the pump assembly by a snap mechanism or a screw mechanism.

11. The dispenser system according to claim 1, wherein the elongated container has a cylinder shape with an aspect ratio of no less than 3:1.

12. The dispenser system according to claim 1, wherein the fluid product is a viscous product.

13. The dispenser system according to claim 12, wherein the viscous product has a viscosity of 100,000 cP to 900,000 cP.

14. The dispenser system according to claim 1, wherein the fluid product is a toothpaste.

15. A method of use of the dispenser system according to claim 1, comprising:

i) disconnecting the standing cap from the pump assembly, and ii) holding the elongated container and pressing the actuator of the pump assembly by finger or thumb to dispense the fluid product.

16. A dispenser system for dispensing a fluid product, comprising:

a) an elongated container configured to contain the fluid product, wherein the elongated container has a closed proximal end and an open distal end, b) a piston slidably positioned in the elongated container, c) a pump assembly fluidically coupled with the open distal end of the elongate container, wherein the pump assembly comprises:

i) an outlet, and ii) an actuator engaged with the outlet, wherein the actuator is configured to move the piston towards the open distal end to dispense the fluid product through the outlet, and d) a standing cap removably coupled with the pump assembly, wherein the standing cap has a supporting structure that defines a supporting plane having a projected area that is larger than a largest cross-sectional area of the elongated container, wherein, when the standing cap is removably coupled to the pump assembly, the supporting structure defines a first end of the dispenser system and the closed proximal end of the elongated container defines a second end of the dispenser system opposite the first end.

* * * * *